United States Patent Office 2,784,835
Patented Mar. 12, 1957

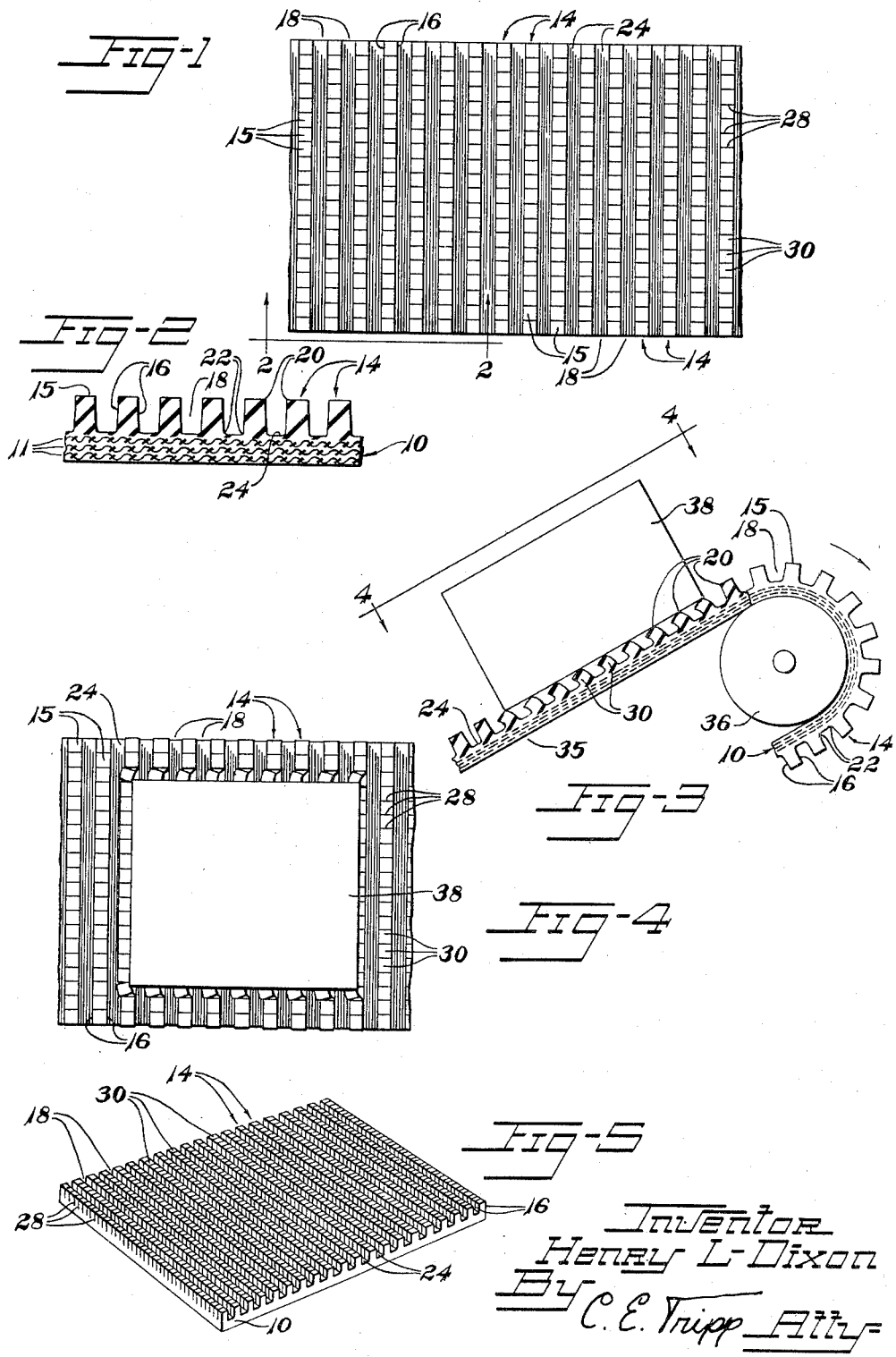

2,784,835

SKID-RESISTANT CONVEYOR BELTING

Henry L. Dixon, Cuyahoga Falls, Ohio, assignor to The B. F. Goodrich Company, New York, N. Y., a corporation of New York Application October 2, 1952, Serial No. 312,743

3 Claims. (Cl. 198—198)

This invention relates to conveyor belts having a rough-textured skid-resistant surface and formed of rubber and rubber-impregnated fabric. The belts of this invention are especially suitable for conveying smooth articles such as cardboard boxes and similar packages along inclined courses.

According to this invention, a conveyor belt is provided with a traction surface formed with a multitude of upstanding prism-shaped fingers of flexible rubber or rubber-like materials. The fingers are provided by laterally slitting at closely spaced intervals each of a plurality of spaced parallel flexible rubber ribs which are molded to the carcass material. The slits are formed through the ribs without removing any appreciable volume of the rubber of each rib so that each of the fingers abuts the fingers adjacent it. The shape of each finger, their flexibility, and the pattern in which they are arranged contribute to provide greatly improved skid resistance and tractive ability, particularly for smooth, hard articles like cardboard cartons. The fingers provide a traction surface with uniform tractional characteristics over its entire area. The material may be manufactured in large quantities with uniform quality. The effectiveness of the traction surface is not impaired even if the fingers are worn down somewhat after a period of service. The nature of the traction surface is such that it may be easily cleaned. The invention will be further described with reference to the accompanying drawings.

In the drawings:

Fig. 1 is a top view of a piece of belt material formed in accordance with and embodying this invention;

Fig. 2 is a cross sectional view taken along the line 2—2 of Fig. 1 and drawn on an enlarged scale;

Fig. 3 is a side elevation showing the belt of this invention utilized as an inclined package conveyor;

Fig. 4 is a view taken from a position indicated by the line 4—4 of Fig. 3; and

Fig. 5 is a perspective view of a piece of the sheet material for forming the belt of this invention.

The conveyor belt shown in the drawing includes a relatively thin, flat carcass portion 10 which is a lamination of several plies 11 of woven fabric impregnated with rubber and sandwiched between layers of rubber. The exact structure of the carcass 10 may vary according to the service for which the belt is to be used. For example, as a conveyor belt for light packages, two or three rubber-impregnated woven fabric plies may be satisfactory to provide the degree of flexibility and the strength required. For heavier duty conveyor belts the construction of the carcass may include strong longitudinal tensile members according to accepted conveyor belt construction.

The contour of the rough-textured traction side of the belt is shown in cross-section in Figure 2. This side of the carcass is initially formed with a plurality of narrow, upstanding ribs 14 which are integrally joined to the carcass and which extend parallel to each other in closely-spaced relation along the carcass. The ribs are preferably of uniform size and ribs formed in substantially the proportional shape shown in Figure 2 have proven to be very effective. As shown in this figure the height of each rib from the carcass 10 to its top surface 15 is greater than the width as measured across its longitudinal sides 16—16. This height-width ratio permits flexibility in the ribs and the degree of flexibility in the ribs is an important factor in obtaining the improved traction characteristics. The spaces 18 between the ribs are preferably less than the height of the rib and are approximately equal to the width of the rib. Each rib 14 has a substantially rectangular cross-sectional shape in that the top surface 15 and the longitudinal upstanding sides 16—16 of each rib are flat and these sides and top surface merge to define sharp substantially right-angle corners 20 along the top surface 15. The ribs are molded to the carcass and for the convenience of molding the ribs, the sides 16—16 of each rib are not perfectly parallel to each other but they taper gradually away from each other from a point close to the top surface 15 to the bottom of the rib. At the bottom of the rib on each side where its side 16 meets the carcass there is a small rounded corner or fillet 22 to reduce stress concentration at this point when the rib is flexed. The fillets 22 each extend into a thin rubber skin 24 which covers the carcass at the bottom of the spaces 18 between adjacent ribs.

To obtain the appreciably improved traction characteristics the ribs 14 are made from soft, resilient rubber compounds and they are divided by a multiplicity of transverse slits 28 located at closely spaced intervals from one end of the ribs to the other. These slits extend through the upper portion of each rib from one side 16 to the other and from the top surface 15 downwardly through a substantial proportion of the height of the rib. Each extends downwardly through at least the upper half of the rib and preferably it terminates close to the bottom of the rib just above the carcass. They are preferably formed perpendicularly to the carcass 10, but they may be formed either perpendicularly to the sides 16 of the ribs as shown or they may be formed obliquely through the ribs.

The slits 28 in each rib divide the ribs into a large number of upstanding prism-shaped fingers 30 which will be arranged in parallel rows on the carcass. The slits as shown in the drawing are very thin and are made without removing any substantial volume of the rubber of the ribs so that the fingers in each row are in successive abutting relation to each other and provide mutual lateral support for each other. The width of the interval between adjacent slits is preferably no more than about the width of the rib and these intervals may be as close together as about $\frac{1}{16}$ inch. The fingers 30 of each rib are each flexible relative to the other fingers and may be readily deflected toward adjacent ribs, the top of each finger moving arcuately about the portion of it joined to the carcass.

In manufacturing the sheet material for the belt of this invention, the carcass 10 is formed by making a lamination of several sheets of rubber-impregnated fabric and other reinforcing materials as desired. Then the carcass together with rubber to form the ribs 14 is vulcanized between suitable mold matrices to form the parallel ribs 14 in solid or continuous form. Then the ribs are sliced crosswise to the desired depth to form the prism-shaped fingers 30. In carrying out the slitting operation the material may (for example) be moved to urge the ribs sideways against a gang of appropriately spaced cutting knives (not shown).

Figs. 3 and 4 illustrate the construction and operation of a package conveyor belt of this invention. For this type service the material will be made in long relatively narrow strips 35 and trained around suitable pulleys such as the driving pulley 36. Preferably the rows of fingers will extend transversely across the belt perpendicularly to the longitudinal axis of the belt although the belts may be also formed with the rows extending obliquely to the longitudinal axis. The rib slits in material used for conveyor belting preferably do not extend all the way to the carcass but terminate slightly above the carcass. This leaves a continuous strip of rubber which extends across the belt under each row of fingers which serves to stiffen the belt in the longitudinal direction but which does not affect the lateral flexibility of the belt. Also, since substantially no rubber material has been removed in the rib-slitting operation the blocks are in mutual engagement, and even though slit, the ribs are also as stiff transversely as if they were plain ribs. The belt may be installed to run on inclined courses uphill as indicated in Fig. 3 or it may be run downhill with equal efficiency.

The desirable self-cleaning feature of the material is shown in Fig. 3. It may be noted that when the belt moves around the pulley 36 to enter into its lower or return run the ribs 14 will be fanned apart to empty any granular material or dirt which may become clogged between the rows of ribs.

The deformation which occurs in the fingers 30 when the articles are carried on the conveyor will depend on the nature of the article being conveyed. Important factors affecting the operation of the belt are the angle of incline of the belt, the weight of the load, the size and shape of the load, the nature of the surface of the load in contact with the belt, etc. For handling articles such as lumps of coal, sacks of sugar, etc. the fingers can engage and interlock with the corners or other portions of these articls in a manner somewhat similar to the way two gears mesh together. The high flexibility of the fingers permit the fingers to adjust themselves to the shape of the article to provide improved gripping power. The deformation of the fingers 30 under a package 38 as shown in Fig. 3 is believed to be substantially typical if the package is assumed to be a cardboard carton. Such cartons are usually very slippery and constitute one of the most difficult types of loads for inclined conveyor belts to handle although a belt made according to this invention can move cardboard cartons remarkably well.

When the carton or package 38 is placed on the conveyor, at first the upper flat surfaces 15 of the fingers fit flat against the surface of the package. Due to the coefficient of friction between the surface 15 of each finger and the surface of the package the fingers are first subjected to a shear load due to the weight of the package and the fingers are distorted backwardly somewhat. If the package has appreciable weight, the resistance forces due to the surface contact will be exceeded and the ribs flexed backwardly so that surfaces 15 are tilted away from the package and the sharp corners 20 of the fingers are presented to the bottom surface of the package. The fingers will tend to resist this bending action and tend to return to an upright position. If any slight slippage occurs between a finger and the surface the finger will start to move toward an upright position, but this movement is immediately opposed by further bending forces. Thus there seems to be a rubbing or chafing action by each of the little fingers which tends to resist any slipping movement. The fingers close to the side edges are flexed sideways toward the margins of the belt to embrace the edges of the package substantially as illustrated in Fig. 4 and to resist lateral movement of the package on the belt. Such an explanation is for the most part theoretical but no other technical reasons are known to explain the improved results.

The top surface 15 of each finger provides a stable foundation support for the package and the tractive ability of the surface is not materially changed even if the upper portions of the fingers wear down a substantial amount during usage. Suitable rubber compounds are selected for making the fingers which have toughness and good abrasion resistance properties but which are also relatively soft and resilient. Compounds having a durometer hardness of about 45 to about 60 have given satisfactory performance.

Fig. 5 shows a perspective view of a piece of the sheet material previously described.

Variations of the structure disclosed may be made within the scope of the appended claims.

I claim:

1. A conveyor belt formed with a relatively thin, flexible carcass and having a load-carrying side which comprises a plurality of narrow, flexible, upstanding resilient rubber ribs disposed parallel to each other and spaced apart a distance substantially equal to the width of the ribs and extending transversely across said load-carrying side, each rib having a substantially rectangular cross-sectional shape, and each rib being slit perpendicularly to the carcass from the top of the rib to a point close to the bottom of the rib at closely-spaced intervals along the rib and without removal of any substantial volume of the rubber to divide the ribs into a multitude of abutting prism-shaped fingers, each prism being flexible relative to the others in the direction of the longitudinal axis of the belt.

2. A conveyor belt having a flexible carcass and a load-carrying side thereon comprising a plurality of narrow flexible closely-spaced resilient ribs of rubber-like material upstanding from the carcass and extending transversely across the load-carrying side, each rib having a flat upper surface and upstanding sides merging with said upper surface to define sharp corners, and each rib being slit transversely from the top of the rib through a major proportion of the height of the rib at closely-spaced intervals and without removal of any substantial volume of rubber to divide each rib into a multitude of laterally abutting flexible fingers, each finger being flexible relative to the others longitudinally of the belt.

3. A conveyor belt having a flexible carcass and a load-carrying side thereon comprising a plurality of narrow, flexible resilient ribs of rubber-like material upstanding from the carcass and extending transversely across the load-carrying side, each rib having a flat upper surface and upstandnig sides merging with said upper surface to define sharp corners, the spacing between adjacent ribs being substantially equal to the width of each rib, and the height of each rib being substantially equal to twice the width of each rib, and each rib being slit transversely from the top of the rib through a major proportion of the height of the rib at closely spaced intervals along the rib and without the removal of any substantial volume of the material of the rib to divide each rib into a multitude of laterally abutting flexible fingers, each finger being flexible relative to the others longitudinally of the belt.

References Cited in the file of this patent

UNITED STATES PATENTS

| | | |
|---|---|---|
| 1,028,783 | Von Rabenau | June 4, 1912 |
| 1,330,988 | Sayre | Feb. 17, 1920 |
| 1,452,099 | Sipe | Apr. 17, 1923 |
| 2,104,532 | Sommer | Jan. 4, 1938 |
| 2,121,955 | Eger | June 28, 1938 |
| 2,428,852 | Muir et al. | Oct. 14, 1947 |
| 2,555,193 | Johnson | May 29, 1951 |

FOREIGN PATENTS

| | | |
|---|---|---|
| 2,943 | Great Britain | Mar. 2, 1886 |
| 6,806 | Great Britain | Apr. 11, 1900 |